United States Patent
Brogle et al.

(10) Patent No.: US 12,494,913 B2
(45) Date of Patent: Dec. 9, 2025

(54) PAIRING PROTOCOL FOR PERIPHERALS WITH A SECURE FUNCTION

(71) Applicant: APPLE INC., Cupertino, CA (US)

(72) Inventors: Kyle C. Brogle, San Francisco, CA (US); Wade Benson, San Jose, CA (US); Sean P. Devlin, New York, NY (US); Lucie Kucerova, Chodoun (CZ); Thomas P. Mensch, Sunnyvale, CA (US); Yannick L. Sierra, San Francisco, CA (US); Tomislav Suchan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 262 days.

(21) Appl. No.: 17/655,147

(22) Filed: Mar. 16, 2022

(65) Prior Publication Data
US 2022/0303137 A1    Sep. 22, 2022

Related U.S. Application Data

(60) Provisional application No. 63/162,323, filed on Mar. 17, 2021.

(51) Int. Cl.
*H04L 29/06* (2006.01)
*G06F 21/44* (2013.01)
(Continued)

(52) U.S. Cl.
CPC ............ *H04L 9/3231* (2013.01); *G06F 21/44* (2013.01); *H04W 12/03* (2021.01)

(58) Field of Classification Search
CPC ... H04L 9/3231; H04L 63/04; H04L 63/0869; H04L 29/08306; H04L 49/30; H04L 49/3081; H04L 2012/5614; H04L 2012/6443; G06F 21/44; G06F 2221/2129; G06F 21/32; G06F 21/6245; G06F 21/83;
(Continued)

(56) References Cited

U.S. PATENT DOCUMENTS 12,143,483 B2    11/2024    Subert et al.
2002/0095587 A1   7/2002    Doyle et al.
(Continued)

FOREIGN PATENT DOCUMENTS

CN    206322182    7/2017

OTHER PUBLICATIONS

McCune et al., "Bump in the Ether: A Framework for Securing Sensitive User Input", Proceedings of the 2006 USENIX Annual Technical Conference, Available Online at: https://www.usenix.org/legacy/event/usenix06/tech/full_papers/mccune/mccune.pdf, May 30, 2006, pp. 185-198.
(Continued)

*Primary Examiner* — Joseph P Hirl
*Assistant Examiner* — Leynna Truvan
(74) *Attorney, Agent, or Firm* — Kilpatrick Townsend & Stockton LLP

(57) ABSTRACT

Embodiments described herein provided techniques to enable peripherals configured to provide secure functionality. A secure circuit on a peripheral device can be paired with a secure circuit on a host device outside of a factory environment without compromising security by verifying silicon keys that are embedded within the secure circuit during manufacturing.

18 Claims, 9 Drawing Sheets

(51) Int. Cl.
*H04L 9/32* (2006.01)
*H04W 12/03* (2021.01)

(58) Field of Classification Search
CPC ............. G06F 21/606; G06F 2212/402; G06F 3/1236; G06F 15/17337; G06F 1/1686; G06F 1/1688; G06F 1/169; G06F 1/1692; G06F 1/1694; G06F 1/1696; G06F 1/1698; G06F 3/3215; G06F 9/00; G06F 9/441; G06F 13/10; G06F 2212/303; G06F 2212/3035; G06F 2213/0024; G06F 3/00; G06F 11/3041; G06F 15/0225; G06F 16/7335; G06F 17/30831; G06F 17/30846; G06F 2203/0381; G06F 2203/0382; G06F 2203/0383; G06F 2203/0384; G06F 2206/1008; G06F 2213/3808; H04W 12/03; H04W 76/00; H04W 76/02; H04W 76/10; G01C 21/3664; G01C 21/283; G01G 21/283; G01J 1/0219; G01J 3/0264; G01N 2201/1266; G03G 15/5016; G03G 21/1652; G03G 21/1657; G05B 23/0216; G05B 2219/13034; G05B 2219/13144; G05B 2219/23067; G05B 2219/2612; G05B 2219/31118; G05B 2219/31121; G05B 2219/31124; G05B 2219/31129; G05B 2219/32128; G05B 2219/33093; G05B 2219/33225; G05B 2219/34441; G05B 2219/35444; G05B 2219/36387; G05B 2219/37095; G05B 2219/1104; G06K 19/0716; G06K 19/0728; G06K 19/07701; G06K 19/07703; G06K 19/07707; G07B 2017/00266; G07D 11/60; G08B 13/19678; G08N 13/19682; G08C 2201/30; G11B 20/00492; G11B 20/00521; G11B 20/00543; G01L 19/0061; G03F 7/70991; G09G 2370/22; H01L 22/22; H01L 27/1116; H04M 1/6091; H04M 3/007; H04M 3/42161; H04M 2203/256; H04M 2250/02; H04M 2250/66; H01J 37/32889; H04J 2203/0025; H04N 1/32747; H04N 1/32756; H04N 1/32577; H04N 1/32582; H04N 5/23216; H04N 5/232933; H04N 5/765; H04N 21/472; H04N 21/485; H04N 2005/44565; H04N 2201/0034; H04N 21/632; H04N 21/4126; H04N 21/42204; H04N 21/436; H04N 21/4367; H04N 21/44231; H04N 2201/0036; H04N 2201/0039; H04Q 1/24; H04Q 3/0016; H04Q 11/0457; H04Q 2213/13107; H04Q 2213/13525; H04R 5/04; H04R 25/55; H04R 25/554; H04R 2205/021; H04R 2225/59; H04R 2420/03; H04R 2420/05; H05K 5/0017; H05K 7/1481
See application file for complete search history.

(56) References Cited

U.S. PATENT DOCUMENTS

| | | |
|---|---|---|
| 2002/0174348 A1 | 11/2002 | Ting et al. |
| 2008/0263363 A1* | 10/2008 | Jueneman ............. H04L 9/0877 713/184 |
| 2012/0102332 A1 | 4/2012 | Mullin |
| 2015/0071502 A1 | 3/2015 | Breznicky |
| 2016/0308855 A1* | 10/2016 | Lacey ................... H04L 63/061 |
| 2017/0093853 A1* | 3/2017 | Boivie .................... G06F 21/00 |
| 2017/0126672 A1 | 5/2017 | Jang |
| 2017/0185762 A1 | 6/2017 | Chang et al. |
| 2017/0238172 A1 | 8/2017 | Benoit et al. |
| 2017/0249451 A1 | 8/2017 | Andreeva |
| 2017/0373844 A1 | 12/2017 | Sykora et al. |
| 2019/0207752 A1 | 7/2019 | Mandal et al. |
| 2020/0228341 A1 | 7/2020 | Mohassel et al. |
| 2020/0313890 A1* | 10/2020 | Mondello ............. H04L 9/3239 |

OTHER PUBLICATIONS

International Search Report and Written Opinion issued in PCT Application No. PCT/US2022/020581, dated Jun. 28, 2022 in 13 pages.

The International Application No. PCT/US2022/020581, "International Preliminary Report on Patentability", mailed Sep. 28, 2023, 9 pages.

U.S. Appl. No. 17/654,964 , "Non-Final Office Action", Jan. 18, 2024, 17 pages.

U.S. Appl. No. 17/654,964 , "Notice of Allowance", Jul. 16, 2024, 14 pages.

Bouazzouni et al., "Trusted Mobile Computing: An Overview of Existing Solutions", Future Generation Computer Systems, vol. 80, Mar. 31, 2018, 17 pages.

International Patent Application No. PCT/US2022/020547 , "International Preliminary Report on Patentability", Sep. 28, 2023, 7 pages.

International Patent Application No. PCT/US2022/020547 , "International Search Report and Written Opinion", Jun. 30, 2022, 11 pages.

* cited by examiner

PAIRING PROTOCOL FOR PERIPHERALS WITH A SECURE FUNCTION

CROSS-REFERENCES TO RELATED APPLICATIONS

The present application claims priority from and is a nonprovisional application of U.S. Provisional Application No. 63/162,323, entitled "Pairing Protocol For Peripherals With A Secure Function" filed Mar. 17, 2021, the entire contents of which are herein incorporated by reference for all purposes.

FIELD

Embodiments described herein relate to a pairing protocol for peripherals having secured functionality.

BACKGROUND

Secure functions on an electronic device can be performed by secure circuits, which provide a secure execution environment that is separate from the primary execution environment. To maintain device security, secure circuits are paired with the device or processor that includes the secure circuit in a factory environment. Should an attempt be made to remove the secure circuit from the device and substitute a different secure circuit, secure functions may no longer be operational on the device.

SUMMARY

Embodiments described herein provided techniques to enable peripherals configured to provide secure functionality. A secure circuit on a peripheral device can be paired with a secure circuit on a host device outside of a factory environment without compromising security by verifying silicon keys that are embedded within the secure circuit during manufacturing.

One embodiment provides an apparatus comprising a data interface, a memory device, and a processor including a first secure circuit. The processor is coupled with the data interface and the memory device and is configured to execute instructions from the memory device. The instructions to cause the processor to establish a first encrypted connection with a host device via the data interface, where the first encrypted connection is established via first cryptographic material, via the first encrypted connection, establish a second encrypted connection with a second secure circuit via second cryptographic material, where the second secure circuit resides on the host device, and transmit a unit of data to the second secure circuit via the second encrypted connection. The transmitted unit of data is opaque to an application processor of the host device.

One embodiment provides a method comprising establishing, by a peripheral device, a first encrypted connection with a host device via the data interface using first cryptographic material, establishing a second encrypted connection between a first secure circuit on the peripheral device and a second secure circuit on the host device using second cryptographic material, the second encrypted connection established via the first encrypted connection, and transmitting a unit of data to the second secure circuit via the second encrypted connection, wherein the unit of data is opaque to an application processor of the host device.

One embodiment provides a data processing system on a peripheral device. The data processing system comprises a memory device and one or more processors to execute instructions stored on the memory device. The instructions cause the one or more processors to perform operations comprising establishing, by the peripheral device, a first encrypted connection with a host device via the data interface using first cryptographic material, establishing a second encrypted connection between a first secure circuit on the peripheral device and a second secure circuit on the host device using second cryptographic material, the second encrypted connection established via the first encrypted connection, and transmitting a unit of data to the second secure circuit via the second encrypted connection. The transmitted unit of data is opaque to an application processor of the host device.

The above summary does not include an exhaustive list of all embodiments in this disclosure. All systems and methods can be practiced from all suitable combinations of the various aspects and embodiments summarized above, and also those disclosed in the Detailed Description below

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
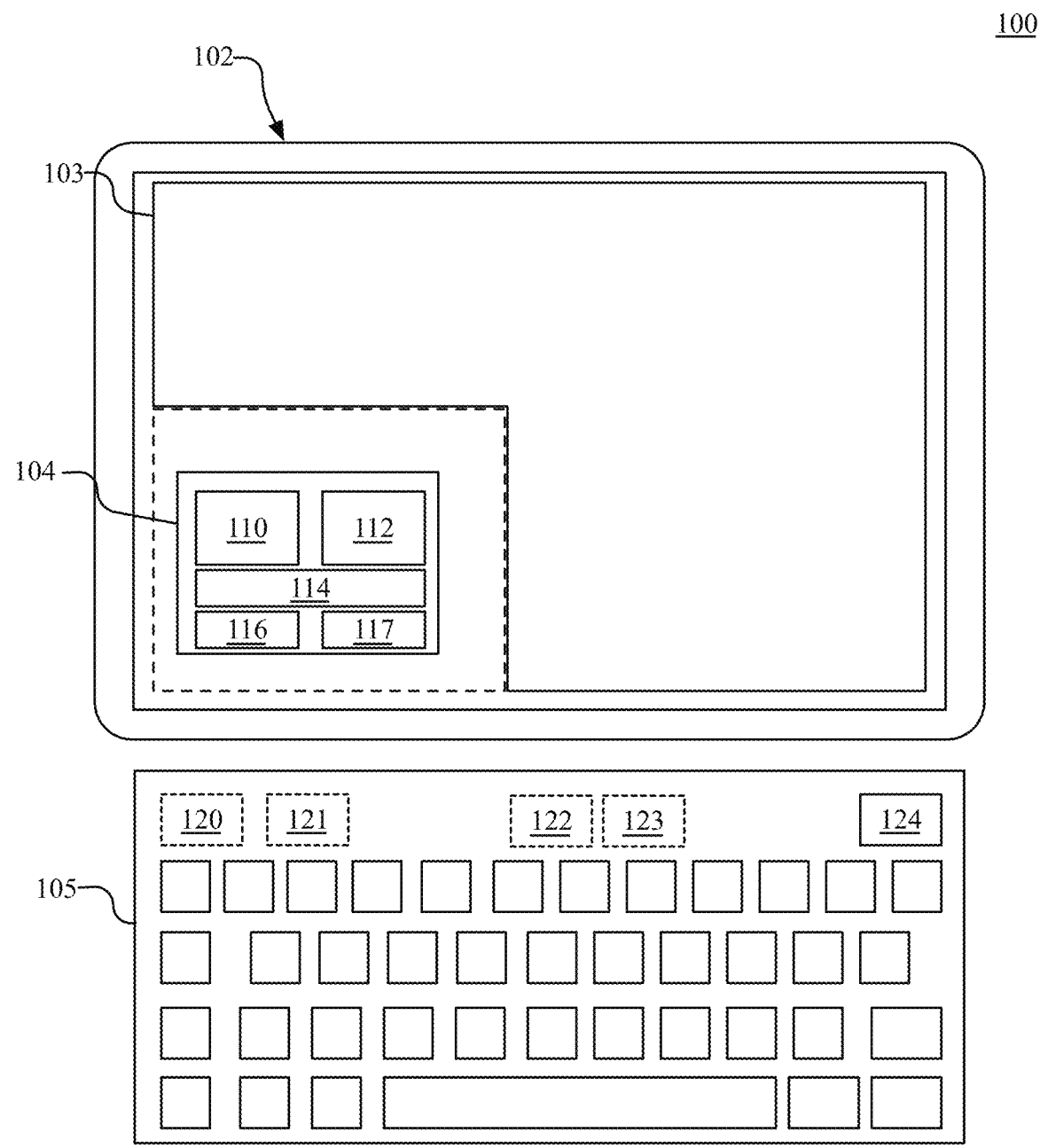
FIG. 1 illustrates a system that includes a host device and a peripheral device.

Embodiments described herein provide techniques to pair peripheral devices with a secure circuit that enable secure functionality with a secure circuit within a host device. The pairing enables an encrypted channel to be established between the secure circuits to enable the exchange of data in a manner that is opaque to other processors of the peripheral and host devices. For example, a peripheral or accessory device can include a biometric sensor that enables biometric authentication of a user. The pairing process between the secure circuits can include a mutual validation and authentication process that is performed between the secure circuits. The pairing of the secure circuits can be performed in addition to any pairing process that occurs between the host and peripheral device. In one embodiment, if the peripheral to host pairing process succeeds and the secure circuit pairing process fails, the pairing process between the peripheral and the host is terminated. In another embodiment, if the peripheral to host pairing process succeeds and the secure circuit pairing process fails, standing peripheral functionality may be allowed, while secure functions that are enabled by the secure circuit pairing are disabled.

One embodiment provides a peripheral device that includes one or more processors in addition to one or more input mechanisms, such as an array of physical keys and/or one or more touch sensitive surfaces. The peripheral device can also include one or more sensor devices, such as a biometric sensor. Exemplary biometric sensors can include but are not limited to fingerprint readers. The peripheral device can couple with the host device via a wireless radio frequency protocol (e.g., Bluetooth®) or via a wired protocol such as a USB protocol. In one embodiment the techniques described herein may be transport agnostic and their capabilities are not limited by the connection mechanism between the peripheral device and the host device. Notwithstanding the transport mechanism, one or more encrypted communication channels can be established between the peripheral device and the host device to secure communication that occurs between the devices. Biometric data that is transmitted to the host device by the peripheral device may be further encrypted to provide an additional layer of security for the biometric data.

In one embodiment, the biometric sensor on the peripheral device can capture biometric data and pre-process the captured data before the data is relayed to the host processor. The pre-processing can include compiling data captured from multiple sensor elements of the biometric sensor and constructing an image that may be validated by biometric authentication logic. The captured data can be pre-processed and pre-validated by a secure circuit on the peripheral device and relayed to a secure circuit on the host device via a secure channel established via the pairing between the secure circuits. The secure circuit pairing is not limited to the relaying of biometric data, and can enable the exchange of data for any secure function provided by the peripheral device.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment.

It should be noted that there can be variations to the flow diagrams or the steps (or operations) described therein without departing from the embodiments described herein. For instance, the steps can be performed in parallel, simultaneously, a differing order, or steps can be added, deleted, or modified.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

FIG. 1 illustrates a system 100 that includes a host device 102 and a peripheral device 105. The host device 102 is an electronic device that includes but is not limited to a tablet computing device, television or television set top box, laptop computing device, or desktop computing device. The peripheral device 105 is peripheral device that includes one or more processors. The peripheral device 105 can be in the form of an input device such as but not limited to a keyboard device or other form of input device. For example, aspects of the peripheral device 105 described herein can be included in a mouse, touchpad, or other input peripheral device.

The host device 102 can include or couple with a display device 103. In one embodiment the host device 102 is a tablet computing device or laptop computing device and the display device 103 is integrated into the host device 102. In one embodiment the host device 102 is a desktop computing device having an integrated display device 103. In one embodiment the host device 102 is a desktop computing device having an interface through which an external display 103 may be coupled. The display device 103 can include any suitable type of display technology, including, but not limited to, liquid crystal display (LCD) technology, organic light-emitting display (OLED) technology, or organic electro luminescence (OEL) technology.

The host device 102 supports a variety of applications, such as one or more of the following: a note taking application, a drawing application, a presentation application, a word processing application, a website creation application, a disk authoring application, a spreadsheet application, a gaming application, a telephone application, a video-conferencing application, an e-mail application, an instant messaging application, a fitness application, a photo management application, a digital camera application, a digital video camera application, a web browsing application, a digital music player application, a digital video player application, and/or a home automation application.

The host device 102 can include an integrated circuit 104, which in one embodiment is a system on a chip integrated circuit. The integrated circuit 104 can include an application processor 110 and a secure circuit 112, a memory device 114, a wireless interface 116 and a wired peripheral interface 117. In one embodiment the application processor 110 is a multi-core application processor including a variety of processing cores. In one embodiment the secure circuit 112 can provide a secure execution environment that is separate and distinct from the execution environment of the application processor 110. The secure circuit 112 may be a secure enclave processor (SEP) or another type of secure processor. The secure circuit 112 can include or couple with cryptographic accelerators, such as a cryptographic engine or public key accelerator. While the secure circuit 112 is illustrated as separate from the application processor 110, in one embodiment, the secure circuit 112 is a component of the application processor 110.

In one embodiment the memory device 114 is dedicated to the application processor 110 and provides an execution space for processes that are executed by the application processor 110. In one embodiment at least a portion of the memory device 114 is a secure memory that may be dedicated for exclusive use by the secure circuit 112. In one embodiment the memory device 114 is a high speed memory that is used as a cache memory for other volatile and/or non-volatile memory devices within or external to the integrated circuit 104. The wireless interface 116 and/or wired peripheral interface 117 can be used to establish a communication channel between components of the integrated circuit 104 and the peripheral device 105. For example, the wireless interface 116 may be a Bluetooth® interface that can be used to enable a wireless pairing between the host device 102 and the peripheral device 105. The wired peripheral interface 117 may be a USB controller that is used to enable a USB connection with the peripheral device 105. In one embodiment, data that is exchanged between the host device 102 and the peripheral device 105 can be encrypted using a secure, transport agnostic communication channel in addition to channel specific encryption that may be enabled for a wired or wireless connection.

The peripheral device 105, in addition to physical input components, can include a wireless interface module 120 and a wired interface module 121 that can be used to facilitate a wireless or wired coupling between the peripheral device 105 and the host device 102. The peripheral device 105 also includes a processor 122 and a secure circuit 123, as well as a biometric sensor 124. The wireless interface module 120, wired interface module 121, processor 122, and secure circuit 123 may be included on a circuit board or integrated circuit that is internal to the peripheral device 105, which may be a system on a chip (SoC) integrated circuit. Additionally, in one embodiment, the secure circuit 123 is included within the processor 122 or is integrated into the same die as the processor 122. Processor 122, in one embodiment, is a general-purpose low power processor that can execute one or more processes via memory internal to the processor 122 or via a memory device that is external to and coupled with the processor 122. The wired interface module 121 can couple with a wired connector on a housing of the peripheral device 105, such as a universal serial bus (USB) connector or another type of peripheral connector. At least a portion of at least one of the biometric sensor 124 may be on an external surface of the peripheral device 105 to facilitate the capture of biometric data.

The secure circuit 123 provides an execution environment for secure processes that is separate from the execution environment provided by the processor 122. The secure circuit 123 can include a secure processor, such as a secure enclave processor (SEP) and/or may be or include a encryption/decryption accelerator, such as a public key accelerator or cryptographic engine. Logic within or executed by the secure circuit 123 can be used to perform construction, pre-processing, and pre-validation operations on data that is captured from the biometric sensor 124. The secure circuit 123 on the peripheral device 105 is paired with the secure circuit 112 on the host device 102 and an encrypted communication channel can be established between the secure circuits. Biometric data can be encrypted by the secure circuit 123 and relayed to the secure circuit 112 through the processor 122 and the application processor 110 to the secure circuit 112 of the host device 102 for validation. The relayed biometric data is opaque to the processor 122, as the data is encrypted using cryptographic material that is known only to the secure circuit 112 of the host device 102 and the secure circuit 123 of the peripheral device 105.

In one embodiment, the biometric sensor 124 includes a fingerprint sensing device, which may be a capacitive sensing device, although other types of sensing devices may also be used. Additionally, peripheral device 105 can also include other types of biometric sensors, such as optical sensors. The exchange of secure data for any secured functionality provided by an accessory or peripheral can be enabled via the secure circuit to secure circuit channel provided by techniques described herein. During an enrollment process for biometric authentication, the biometric sensor 124 can be used to capture a baseline biometric image. Structured feature representations can be extracted from the biometric image and stored as template data in a template database within the secure circuit 112. During a subsequent biometric query associated with a biometric authentication attempt, a query image is captured by the biometric sensor 124 and the feature extraction process is applied to the query image. The features extracted from the query image can be compared to the features of the template data to determine a match. The biometric data can be captured and pre-processed by the secure circuit 123 on the peripheral device 105 and then transmitted to the secure circuit 112 on the host device 102 via the encrypted channel that is established between the secure circuits. The encrypted channel between the secure circuits enables biometric data to be validated without exposing the biometric data to any other logic elements of the system.

Figure 2:
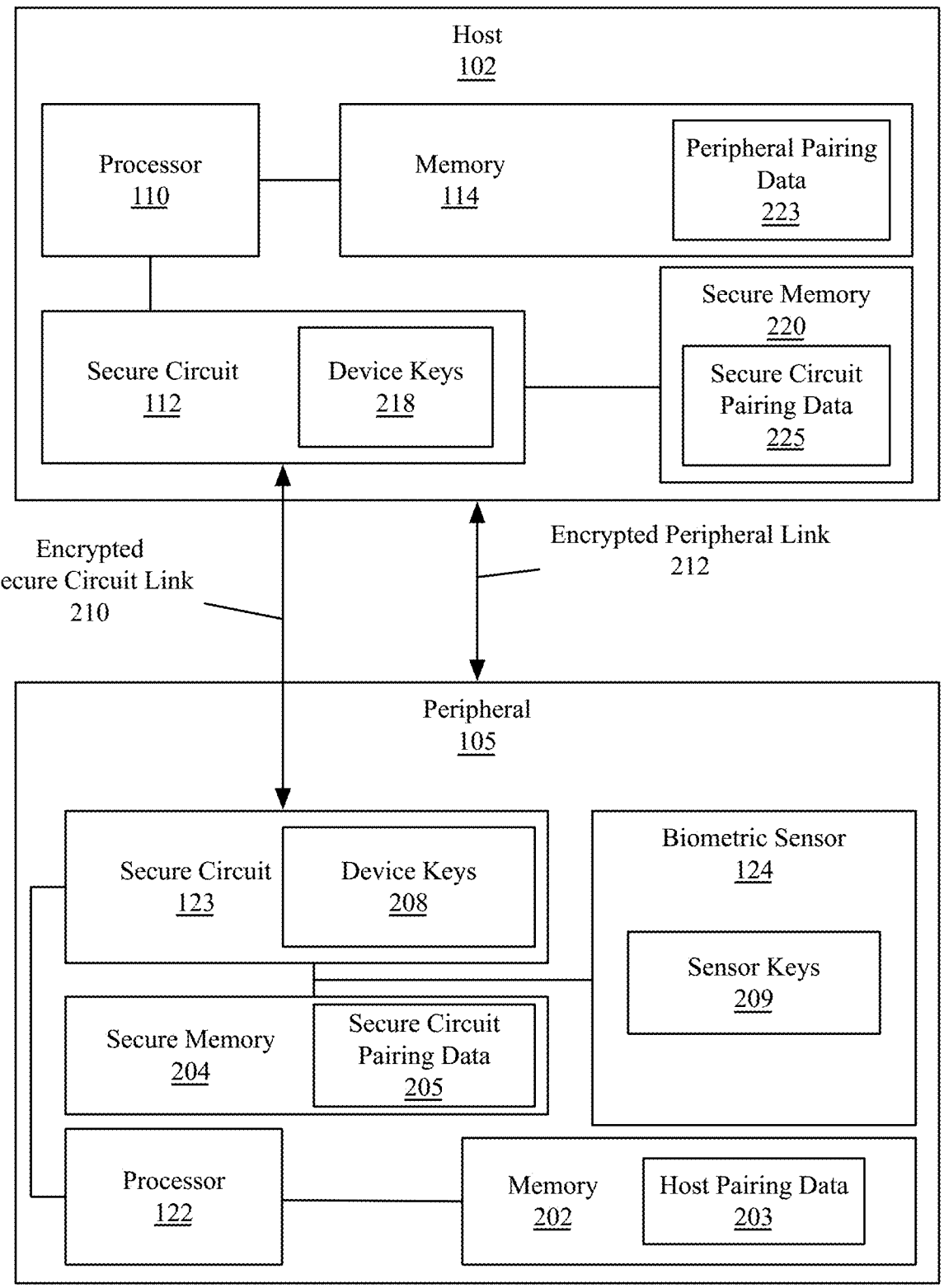
FIG. 2 illustrates a system in which an encrypted link is established between the peripheral device and the host device.

FIG. 2 illustrates a system 200 in which an encrypted secure link 210 is established between the peripheral device 105 and the host device 102. In one embodiment, the host device 102 includes a secure memory 220 coupled with the secure circuit 112 of the host device 102. Secure memory 220 is a memory device that is dedicated for use by the secure circuit 112. In various embodiments, secure memory 220 may be a separate memory device or a separately encrypted portion of memory device 114 that is inaccessible to the application processor 110. In one embodiment the peripheral device 105 also includes secure memory 204, which may be a dedicated memory device or a portion of a memory device 202 that is also coupled with the processor 122 of the peripheral device 105. Where the secure memory 204 is part of the memory device 202, the secure memory 204 is encrypted with keys accessible only to secure circuit 123 and data in the secure memory 204 is not accessible by the processor 122. The secure memory 220 of the host device 102 can store secure circuit pairing data 225 that is created as a result of the pairing between the secure circuit 112 and the secure circuit 123. The memory device 114 can store peripheral pairing data 223 that is created after the host device 102 is paired with the peripheral device 105. In some embodiments, the secure memory 220 can also store the peripheral pairing data 223. The secure memory 204 of the peripheral device 105 can store secure circuit pairing data 205 that is created as a result of the pairing between the secure circuit 112 and the secure circuit 123. The memory device 202 can store host pairing data 203 that is created after the host device 102 is paired with the peripheral device 105. In some embodiments, the host pairing data 203 is also stored in the secure memory 204.

The pairing data stored by the host device 102 and the peripheral device 105 is used to enable the host device 102 and the peripheral device 105 to identify and validate one another upon connection, and can also include cryptographic material that can be used encrypt data that is exchanged between the devices. The peripheral pairing data 223 and host pairing data 203 can include cryptographic material that can be used to establish an encrypted peripheral link 212 between the host device 102 and the peripheral device 105. The secure circuit pairing data 225 and secure circuit pairing data 205 can include cryptographic material that is used to establish an encrypted secure circuit link 210. The encrypted secure circuit link 210 may be encapsulated within the encrypted peripheral link 212. The encrypted peripheral link 212 can be established over the data connection that enables communication between the peripheral device 105 and the host device 102, which can be, for example, a USB connection, a Bluetooth® connection, or another type of external peripheral connection (e.g., Thunderbolt™, etc.). The encrypted peripheral link 212 can include encryption provided by the communication protocol, such as an encrypted wireless connection. The encrypted peripheral link 212 can also include additional layers of encryption that can be configured by the host device 102 and the peripheral device 105 for peripheral device data that is transmitted over a wired connection.

The encrypted peripheral link 212 can be established as a result of a bonding or pairing operation that is performed between the host device 102 and the peripheral device 105. The encrypted secure circuit link 210 is established as a result of a further bonding or pairing operation that is performed between the secure circuit 112 of the host device 102 and the secure circuit 123 of the peripheral device 105. The encrypted secure circuit link 210 can be established using per-session keys that differ from the keys used to encrypt the encrypted peripheral link 212 and that are re-generated each communication session.

In one embodiment the pairing process between the secure circuits 112, 123 includes a mutual validation and authentication process. Device keys 218 that are stored by secure circuit 112 can be used to identify the secure circuit 112 during the pairing operation and can additionally include attestation keys that enable the determination of the validity of hardware keys for the secure circuit 112 and/or attest to the validity of keys generated by the secure circuit based on the hardware keys. Device keys 208 that are stored by secure circuit 123 can be used to identify and/or attest to the validity of secure circuit 123, and/or keys generated by the secure circuit 123, during the pairing operation. In some embodiments, one or more device keys and/or certificates may also be stored in secure memory 220 and/or secure memory 204. Where the peripheral device 105 includes a biometric sensor 124, the biometric sensor 124 can include on-device memory that stores sensor keys 209 that are used to uniquely identify and/or authenticate the biometric sensor 124 to the secure circuit 123 and the secure circuit 112. Alternatively, the sensor keys 209 may be stored in the memory device 202 or the secure memory 204.

Figure 3A:
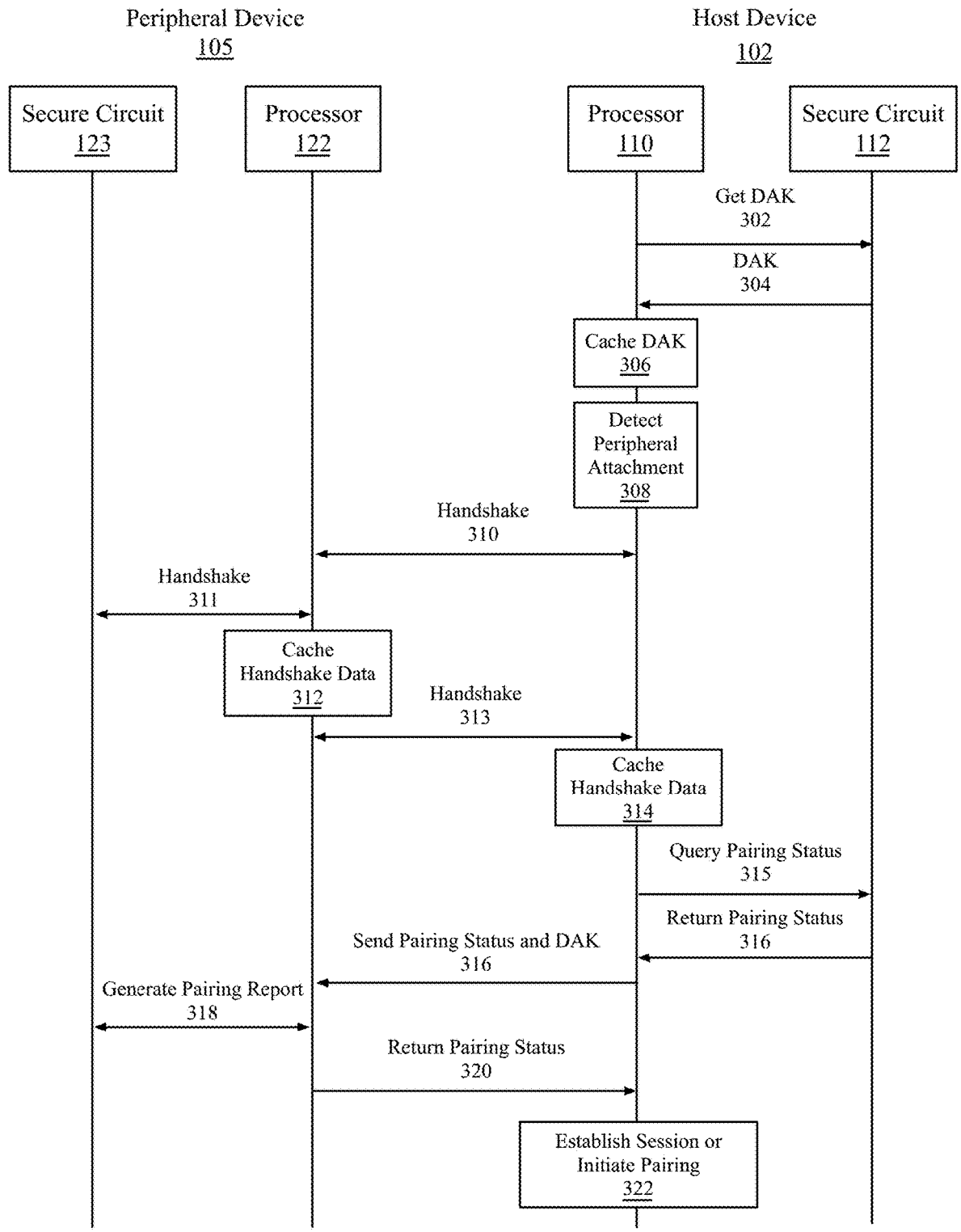
FIG. 3A-3C illustrate a pairing sequence for the peripheral device and host device and their associated secure circuits.
Figure 3B:
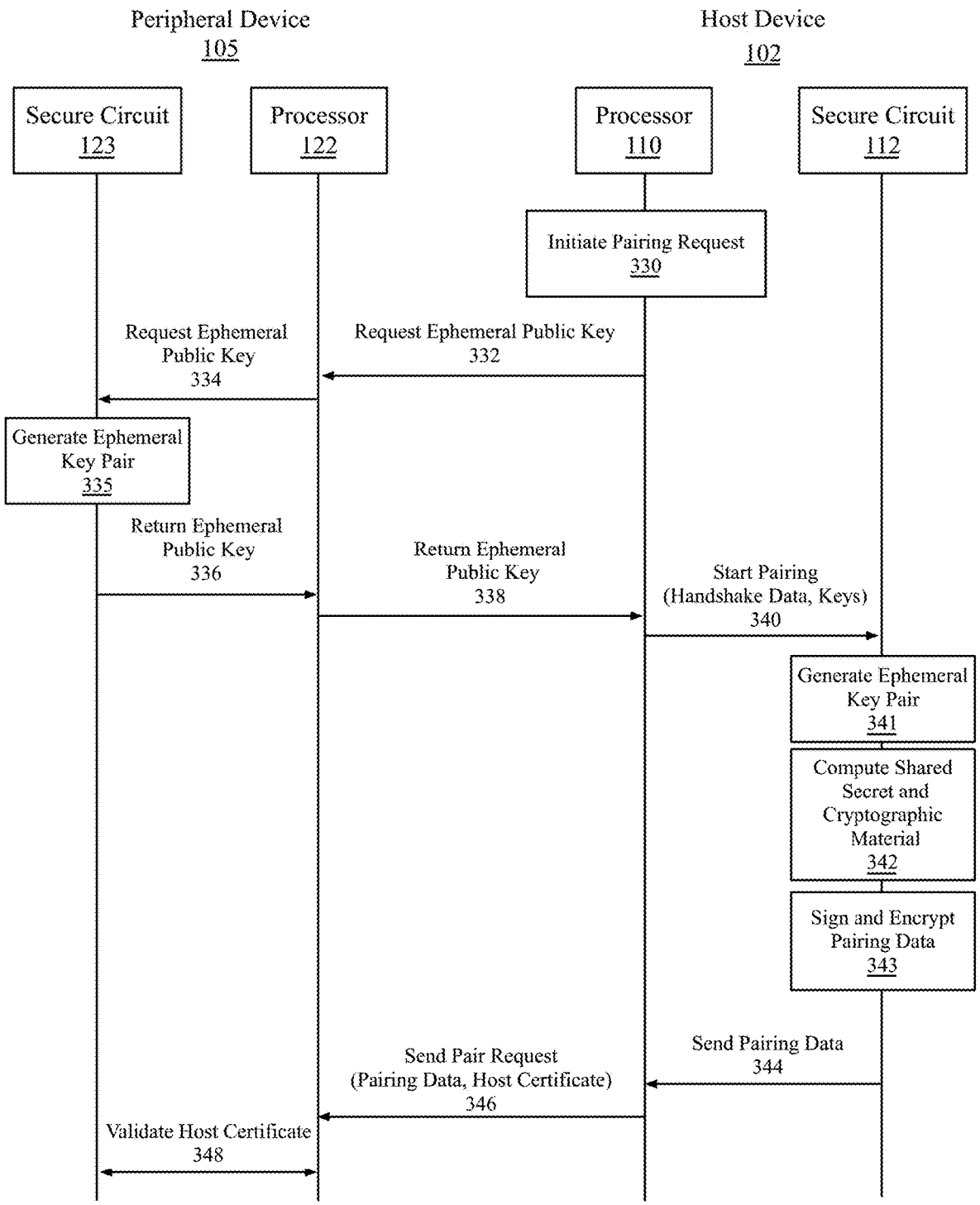
Figure 3C:
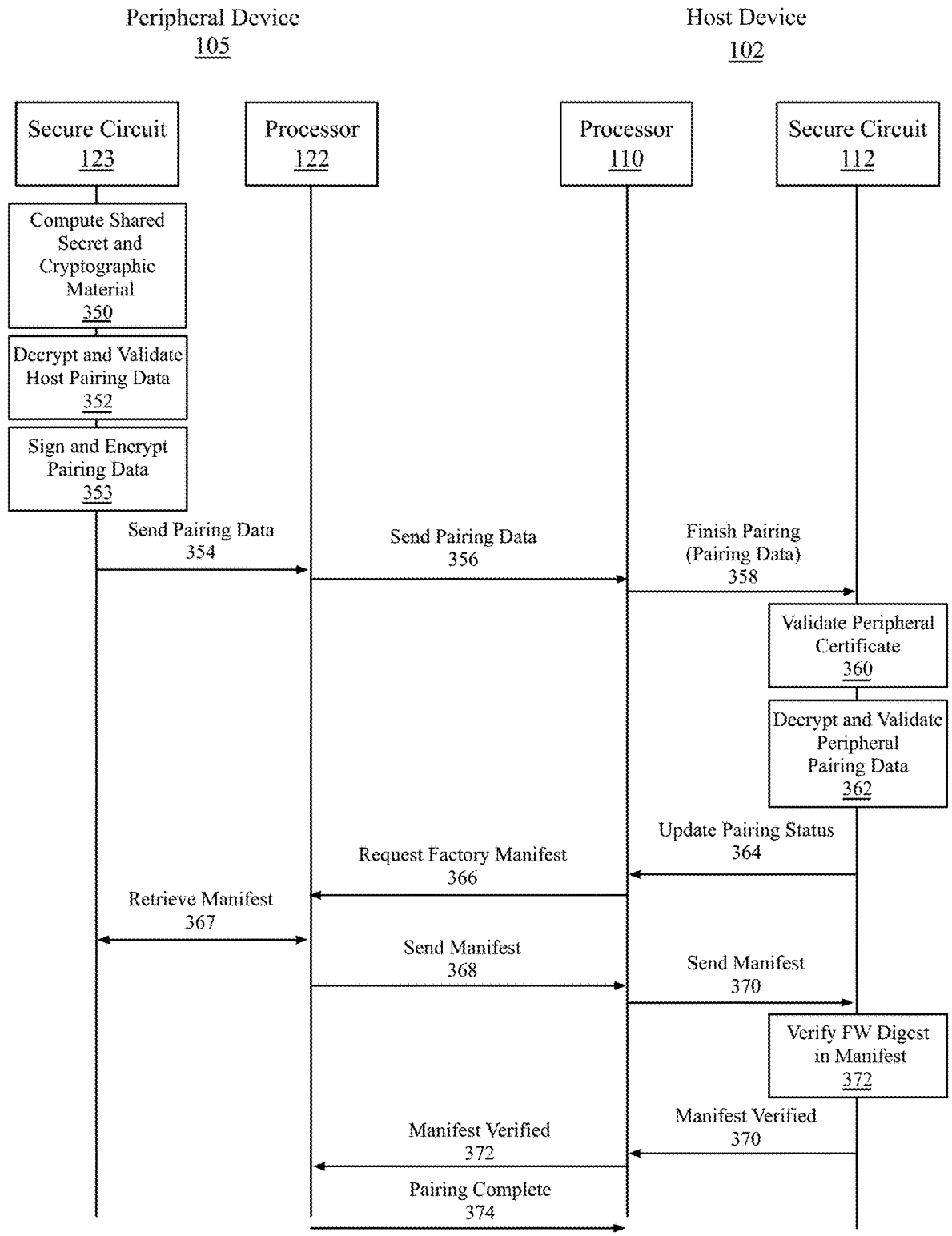

FIG. 3A-3C illustrate a pairing sequence for the peripheral device 105 and host device 102 and their associated secure circuits 123, 112. FIG. 3A illustrates a connection sequence between a peripheral device 105 and a host device 102. FIG. 3B illustrates a sequence of operations to initiate pairing between the peripheral device 105 and the host device 102. FIG. 3C illustrates a sequence of operations to complete pairing between the peripheral device 105 and the host device 102, including completing the pairing between the secure circuits within the devices. The application processor 110 of the host device 102 can execute application and/or operating system software for the host device, including software to provide a user interface that enables a user to pair the peripheral device 105 with the host device 102. The application processor 110 can also execute an accessory manager that manages attachment and pairing with the peripheral device 105. Processor 122 can perform non-secure operations for the peripheral device 105 and cooperate with the secure circuit 123 to perform secure functions.

The pairing process between the peripheral device 105 and the host device 102 includes mutual validation of the authenticity of the peripheral device 105 and host device 102. In one embodiment, mutual validation is performed based on one or more hardware identifiers, keys, and/or certificates. One or more hardware identifiers can be burned on to a register or fuse of one or more components of each of the peripheral device 105 and host device 102 during manufacturing. For example, a global identifier (GID) can be burned into the processors 110, 122 and secure circuits 112, 123 that specifies a global classification or type for the processors and circuits. A unique identifier (UID) can also be randomly generated and burned into the processors 110, 122 and secure circuits 112, 123 that uniquely identifies each component. One or more hardware keys and associated certificates can be generated and/or derived based on the GID and/or UID. Additionally, one or more attestation keys can be generated that can be used to attest to the validity of keys generated by the secure circuit based on the hardware keys.

As shown in FIG. 3A, in one embodiment, the application processor 110 of the host device 102 can request (302) a device attestation key (DAK) from the secure circuit 112. The DAK can be one of the device keys 218 of FIG. 2 that are stored by the secure circuit 112 within a secure key store, which in various embodiments resides within the secure circuit 112 or in secure memory 220 coupled with the secure circuit 112. The DAK can be used to attest to the validity of keys generated by the secure circuit and to the identity and current state of the secure circuit. In one embodiment, the DAK is a long term public/private key pair for the secure circuit 112 that is generated at the factory for the host device 102. In one embodiment, the DAK public/private key pair may be rolled or re-generated during an operating system re-install or re-initialization for the host device 102. In response to the request, the secure circuit 112 can return (304) the public key portion of the DAK to the application processor 110. The application processor 110 can then cache (306) the public key portion of the DAK until the subsequent attachment of the peripheral device 105. The application processor 110, via an accessory manager module, can detect (308) attachment of the peripheral device 105 via one or more of a wired or wireless interconnect, such as but not limited to USB or Bluetooth™.

Upon attachment, a set of handshake operations (310) can be performed between software components executed by the processor 122 of the peripheral device 105 and the application processor 110 of the host device 102. One or more firmware components of the peripheral device 105 and/or host device 102 can also participate in the handshake operation. In one embodiment, during the handshake operations, accessory management logic executed by application processor 110 can determine the accessory protocol version used by the peripheral device 105 and request the UID and DAK of the secure circuit 123. Handshake operations (311) can also be performed between the secure circuit 123 and the processor 122 of the peripheral device 105, which can include requesting the UID and public portion of the DAK from the secure circuit 123. The processor 122 can cache (312) data received by the processor 122 from the secure circuit 123 during the handshake operations (311), and perform further handshake operations (313) to relay the received data to the application processor 110 of the host device 102. The processor 110 can then cache (314) or otherwise store the handshake data received from the peripheral device 105.

Using the received handshake data, application processor 110 can send a query (315) to the secure circuit 112 of the host device 102 to determine a pairing status for the peripheral device 105. The secure circuit 112 can reference secure circuit pairing data 225 in secure memory 220, as shown in FIG. 2, while the processor 110 can reference peripheral pairing data 223 in memory device 114. Data received during the handshake operations with [the] peripheral device 105 can be compared with stored data to determine whether an existing bond is present with the peripheral device 105 and secure circuit 123. The secure circuit 112 can return (316) a pairing status to the application processor 110. The application processor 110 can send (316) the pairing status and the public portion of the DAK of the secure circuit 112 of the host device 102 to the processor 122 of the peripheral device 105. This DAK and pairing status are then used by the secure circuit 123 and the processor 122 of the peripheral device 105 to generate (318) a pairing report. The processor 122 can then return (320) a pairing status to accessory management logic that executes on the application processor 110 of the host device 102. The accessory management logic executed by the application processor 110 can then perform operations (322) to either establish a secure session with the peripheral device 105 and between the secure circuits 112, 123 or to initiate the pairing operation. The pairing operation can be initiated if no pairing exists between the devices or circuits. Additionally, if the pairing status returned from the peripheral device 105 indicates that only one of the peripheral device 105 or the host device 102 has correct pairing data, a new pairing initiation can be performed. For example, if the peripheral device 105 and host device 102 were previously paired and a new DAK is generated for the host device 102, either as a result of a key rolling operation or an operating system re-install, a new pairing operation will be performed.

As shown in FIG. 3B, accessory management logic executed by the application processor 110 of the host device 102 can initiate (330) a pairing request with the peripheral device 105. The accessory management logic can cause the application processor 110 to send a request (332) to the peripheral device 105 for an ephemeral public key. The processor 122 can send an additional request (334) to the secure circuit 123 for the ephemeral public key. In response, the secure circuit 123 can perform operations (335) to generate and cache an ephemeral key pair. The secure circuit 123 can then return (336) the public key portion of the ephemeral key pair to the processor 122. The processor 122 then returns (338) the public key portion of the ephemeral key pair to the accessory management logic executed by the application processor 110 of the host device 102. The accessory management logic can then cause the application processor 110 to send a command (340) to the secure circuit 112 to start a pairing operation. The command to start the pairing operation can include handshake data (e.g., UID, DAK, etc.) previously received from the peripheral device 105, as well as the ephemeral public key generated by the secure circuit 123 of the peripheral device 105.

In response to the command to start pairing operations, the secure circuit 112 can perform operations to generate (341) an ephemeral key pair and compute (342) a shared secret and cryptographic material derived from the shared secret. The shared secret can be created, in one embodiment, using an elliptic curve Diffie-Hellman (ECDH) operation using the ephemeral public keys generated by the secure circuit 123 and the secure circuit 112. The generated shared secret can be provided to a key derivation function that can be configured to output a variety of keys having a variety of key lengths based on the shared secret. The ephemeral public keys generated by the secure circuit 123 and the secure circuit 112 can also be combined into salt values that are provided as input to the key derivation function. In one embodiment the key derivation function is used to derive multiple keys, including host and accessory session keys, encryption keys, and signing keys that are used to sign and encrypt (343) pairing data that will be transmitted to the peripheral device 105. The pairing data includes DAK associated with the secure circuit 112, the public portion of the ephemeral key pair generated by the secure circuit 112, and attestation data that is generated for one or more elements of the pairing data based on the DAK of the secure circuit 112. The secure circuit 112 can then send (344) the signed and encrypted pairing data to the application processor 110. The application processor 110 can then send (346) a pair request to the processor 122 of the peripheral device 105. The pair request can include the pairing data and a host certificate that identifies and/or attests to the validity of the host device 102. The processor 122 and secure circuit 123 on the peripheral device 105 can then perform multiple operations (348) to validate the host certificate.

As shown in FIG. 3C, if the secure circuit 123 and processor 122 determine that the host certificate received from the host device 102 is valid, the secure circuit 123 can then perform operations (350) to compute a shared secret and generate or derive cryptographic material using techniques similar to those performed by the secure circuit 112 of the host device 102. The cryptographic material enables the secure circuit 123 to perform operations (352) to decrypt and validate the host pairing data. Validating the host pairing data can include verifying the authenticity of the secure circuit 112 and/or keys generated by the secure circuit 112 via attestation data received within the pairing data. The secure circuit 123 can also generate host and accessory session keys that will be used to encrypt data for the communication session to be established after pairing is complete. Upon successful validation of the host pairing data, the secure circuit 123 can generate pairing data to be transmitted to the host device. Pairing data for the peripheral device 105 can include device certificates and attestation data for the peripheral device 105. The secure circuit 123 can perform an operation (353) to sign and encrypt the pairing data and send (354) the pairing data to the processor 122.

The processor 122 can then send (356) the pairing data to the host device 102. Accessory management logic executed by the application processor 110 of the host device 102 can receive the pairing data from the peripheral device 105 and send a command (358) to the secure circuit 112 to finish the pairing operation. Upon receipt of the command to finish pairing, the secure circuit 112 can perform an operation (360) to validate the peripheral certificate within the pairing data. If valid, the secure circuit 112 can proceed to perform operations (362) to decrypt and validate the pairing data received from the peripheral, which can include verifying the validity and authenticity of the secure circuit 123 and peripheral device 105. Upon successful validation of the peripheral pairing data, the secure circuit 112 of the host device 102 can update (364) the pairing status to indicate that the secure circuit 123 and peripheral device 105 are paired with the host device 102 and secure circuit 112. If the pairing process fails, either for the peripheral device 105 or for the secure circuit 123, the peripheral device 105 is unpaired from the host device 102 and the pairing process may be terminated. Once the secure circuit 112 determines that the host device 102 and secure circuit 112 is to be paired with the peripheral device 105 and secure circuit 123 session encryption keys can be configured to enable the establishment of the secure communication channel between the secure circuit 123 of the peripheral device 105 and the secure circuit 112 of the host device 102.

In some embodiments, an additional set of operations are performed by the host device 102 to verify that the peripheral device 105 has not been added to a list of blocked devices, or in one embodiment, is explicitly found in a list of allowed devices. Accessory management logic on the application processor 110 can request (366) a factory manifest from the peripheral device 105. The processor 122 of the peripheral device 105 can perform operations (367) with the secure circuit 123 to retrieve the manifest from secure storage. The processor 122 can then send (368) the manifest to the host device 102. The application processor 110 of the host device 102 can then send (370) the manifest to the secure circuit 112 of the host device 102 for verification. The secure circuit 112 can verify that the manifest format and entitlements are correct, and then verify the firmware digest that is listed in the manifest is the same as the digest associated with attestation data received from the peripheral device 105 earlier in the pairing process. In response to verification of the manifest and firmware digest, the secure circuit 112 can send a manifest verified message (370) to the application processor 110 that indicates that the manifest and digest have been verified. Logic executed by the application processor 110 can then send a manifest verified message (372) to the processor 122 of the peripheral device 105. In response, the processor 122 of the peripheral device 105 can indicate to the application processor 110 that the pairing process is complete via a pairing complete message (374). Once pairing is complete, secure functionality of the peripheral device 105 can be enabled.

Figure 4:
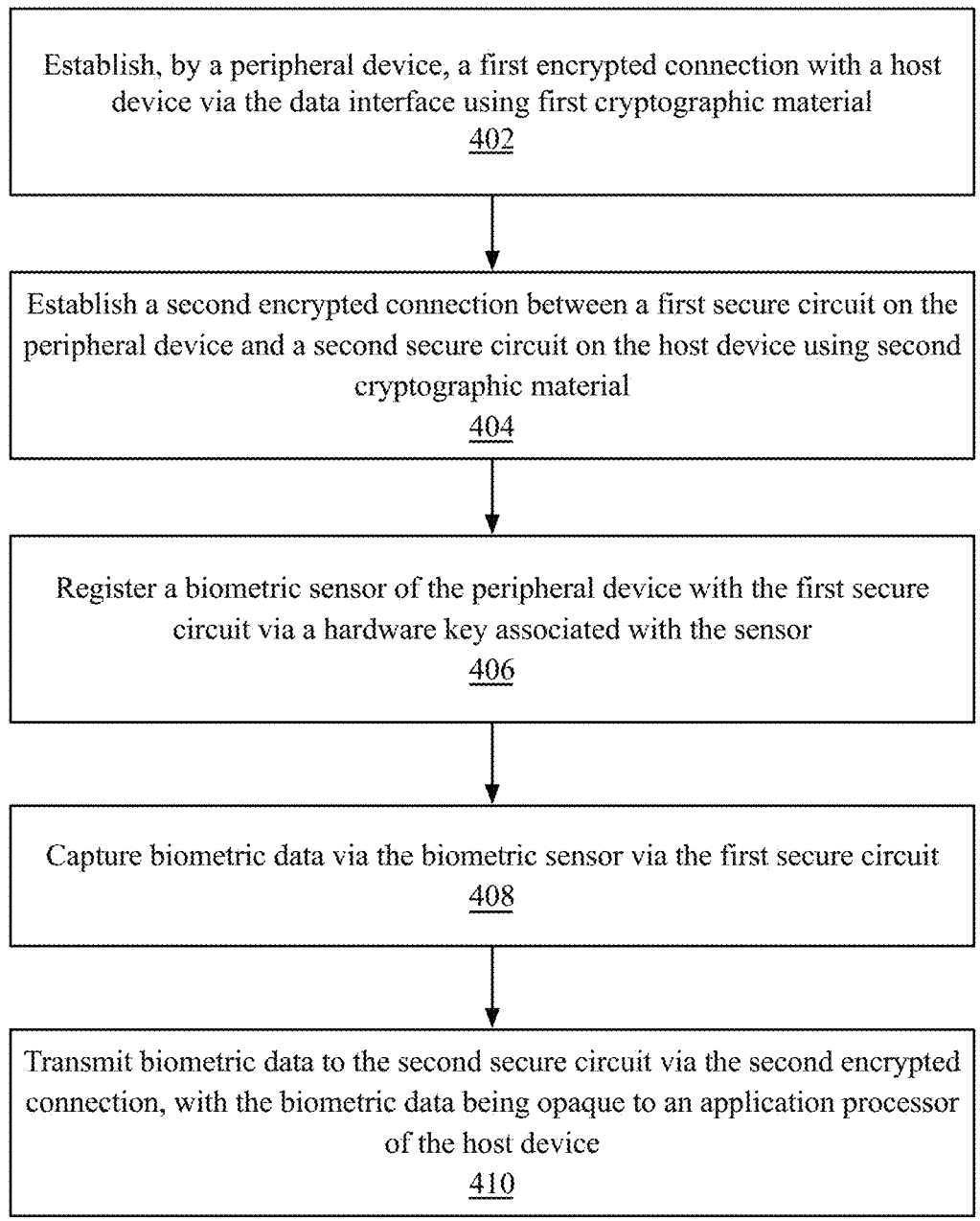
FIG. 4 illustrates a method of performing a secure function with a peripheral device having a secure circuit that is paired with a secure circuit of a host device.

FIG. 4 illustrates a method 400 of performing a secure function with a peripheral device 105 having a secure circuit 123 that is paired with a secure circuit 112 of a host device 102. The method 400 includes operations to relay biometric data captured via a biometric sensor. However, the encrypted communication channel that is established between the paired secure circuits is not limited to the relay or exchange of biometric data and can be used to enable other secure functions.

Method 400 can include, in one embodiment, an operation (402) to establish, by a peripheral device, a first encrypted connection with a host device via the data interface using first cryptographic material. The first cryptographic material can include cryptographic material that is used to establish the encrypted peripheral link 212 as in FIG. 2, where the encrypted peripheral link 212 is an example of the first encrypted connection. The method 400 additionally includes an operation (404) to establish a second encrypted connection between a first secure circuit on the peripheral device and a second secure circuit on the host device using second cryptographic material. The second cryptographic material can include cryptographic material that is used to establish the encrypted secure circuit link 210 of FIG. 2, where the encrypted secure circuit link 210 is an example of the second encrypted connection. The second encrypted connection can be encapsulated within the first encrypted connection. The second cryptographic material can include session keys that are generated when pairing the secure circuit 123 of the peripheral device 105 and the secure circuit 112 of the host device 102. The secure circuit pairing is performed as part of the pairing process between the peripheral device 105 and the host device 102, as shown in FIG. 3A-3C.

Where the secure function of the peripheral device includes the use of a biometric sensor, the method 400 can optionally include an operation (406) to register the biometric sensor of the peripheral device with the first secure circuit via a hardware key associated with the sensor. The hardware key associated with the sensor can be read by the first secure circuit of the peripheral device and validated to determine the authenticity of the biometric sensor. Operations to validate and authenticate the biometric sensor can be performed by one or both secure circuits. For example, the first secure circuit can perform an initial validation of the biometric sensor during initialization of the peripheral device. The second secure circuit can trust the biometric sensor based on the validation performed by the first secure circuit or can perform an additional validation of the biometric sensor after the second encrypted connection is established. The host device can then make use of the biometric sensor as though the sensor were embedded within the host device and hard-wired to the secure circuit of the host device. For example, method 400 can include operations (408) to enable the first secure circuit to capture biometric data via the biometric sensor. In one embodiment, the first secure circuit can perform pre-processing and/or pre-validation operations on the captured biometric data. Pre-validation can be performed to determine whether the captured biometric data meets one or more minimum quality criteria before the biometric data is relayed to the host. The method 400 additionally includes operations (410) that cause the second secure circuit to transmit the biometric data to the second secure circuit via the second encrypted connection. As the biometric data is transmitted via the second encrypted connection, which is based on encryption keys that are unknown to the application processor of the host device, the biometric data is opaque to the application processor of the host device. The application processor can relay the opaque biometric data to the secure circuit of the host device without exposing the data to processes executed by the application processor that may wish to maliciously access the biometric data that is captured via the biometric sensor of the peripheral device. The techniques of method 400 can be adjusted for application to any data associated with a secure function provided by a peripheral device that includes a secure circuit.

Figure 5:
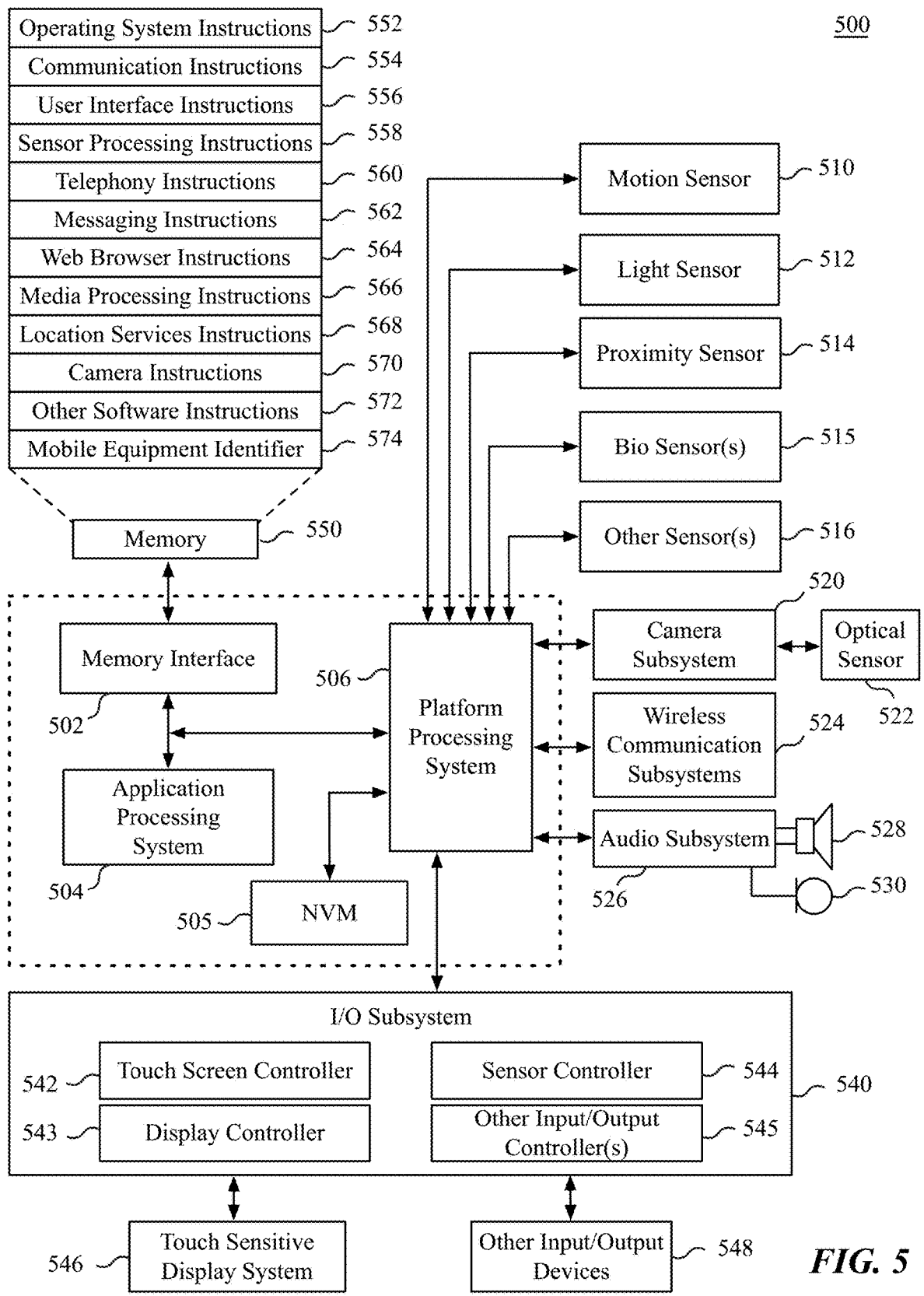
FIG. 5 is a block diagram of a computing device architecture, according to embodiments described herein.

FIG. 5 is a block diagram of a computing device architecture 500, according to an embodiment. The computing device architecture 500 includes a memory interface 502, a processing system 504, and a platform processing system 506. The platform processing system 506 can implement secure peripheral access and system authentication according to embodiments described herein. The various components can be coupled by one or more communication buses, fabrics, or signal lines. The various components can be separate logical components or devices or can be integrated in one or more integrated circuits, such as in a system on a chip integrated circuit. The processing system 504 may include multiple processors and/or co-processors. The various processors within the processing system 504 can be similar in architecture or the processing system 504 can be a heterogeneous processing system. In one embodiment, the processing system 504 is a heterogeneous processing system including one or more data processors, image processors and/or graphics processing units.

The memory interface 502 can be coupled to memory 550, which can include high-speed random-access memory such as static random-access memory (SRAM) or dynamic random-access memory (DRAM). The memory can store runtime information, data, and/or instructions are persistently stored in non-volatile memory 505, such as but not limited to flash memory (e.g., NAND flash, NOR flash, etc.). Additionally, at least a portion of the memory 550 is non-volatile memory. The platform processing system 506 can facilitate the communication between the processing system 504 and the non-volatile memory.

Sensors, devices, and subsystems can be coupled to the platform processing system 506 to facilitate multiple functionalities. For example, a motion sensor 510, a light sensor 512, and a proximity sensor 514 can be coupled to the platform processing system 506 to facilitate the mobile device functionality. Other sensors 516 can also be connected to the platform processing system 506, such as a positioning system (e.g., GPS receiver), a temperature sensor, a biometric sensor, or other sensing device, to facilitate related functionalities. A camera subsystem 520 and an optical sensor 522, e.g., a charged coupled device (CCD) or a complementary metal-oxide semiconductor (CMOS) optical sensor, can be utilized to facilitate camera functions, such as recording photographs and video clips.

In one embodiment, the platform processing system 506 can enable a connection to communication peripherals including one or more wireless communication subsystems 524, which can include radio frequency receivers and transmitters and/or optical (e.g., infrared) receivers and transmitters. The specific design and implementation of the wireless communication subsystems 524 can depend on the communication network(s) over which a mobile device is intended to operate. For example, a mobile device including the illustrated computing device architecture 500 can include wireless communication subsystems 524 designed to operate over a network using Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The wireless communication subsystems 524 can provide a communications mechanism over which a client browser application can retrieve resources from a remote web server. The platform processing system 506 can also enable an interconnect to an audio subsystem 526, which can be coupled to a speaker 528 and a microphone 530 to facilitate voice-enabled functions, such as voice recognition, voice replication, digital recording, and telephony functions.

The platform processing system 506 can enable a connection to an I/O subsystem 540 that includes a touch screen controller 542 and/or other input controller(s) 545. The touch screen controller 542 can be coupled to a touch sensitive display system 546 (e.g., touch screen). The touch sensitive display system 546 and touch screen controller 542 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 546. Display output for the touch sensitive display system 546 can be generated by a display controller 543. In one embodiment, the display controller 543 can provide frame data to the touch sensitive display system 546 at a variable frame rate.

In one embodiment, a sensor controller 544 is included to monitor, control, and/or processes data received from one or more of the motion sensor 510, light sensor 512, proximity sensor 514, or other sensors 516. The sensor controller 544 can include logic to interpret sensor data to determine the occurrence of one of more motion events or activities by analysis of the sensor data from the sensors.

In one embodiment, the platform processing system 506 can also enable a connection to one or more biometric sensor(s) 515. The one or more biometric sensor(s) can be a fingerprint reader or other biometric sensor described herein that is configured to detect biometric data for a user of computing device. Biometric data may be data that at least quasi-uniquely identifies the user among other humans based on the user's physical or behavioral characteristics. For example, in some embodiments the biometric sensor(s) 515 can include a finger print sensor that captures fingerprint data from the user. In another embodiment, biometric sensor(s) 515 include a camera that captures facial information from a user's face. In some embodiments, the biometric sensor(s) 515 can maintain previously captured biometric data of an authorized user and compare the captured biometric data against newly received biometric data to authenticate a user. As described herein, in one embodiment, one or more biometric sensor(s) 515 can also be included in a peripheral device.

In one embodiment, the I/O subsystem 540 includes other input controller(s) 545 that can be coupled to other input/control devices 548, such as one or more buttons, rocker switches, thumb-wheel, infrared port, USB port, and/or a pointer device such as a stylus, or control devices such as an up/down button for volume control of the speaker 528 and/or the microphone 530.

In one embodiment, the memory 550 coupled to the memory interface 502 can store instructions for an operating system 552, including portable operating system interface (POSIX) compliant and non-compliant operating system or an embedded operating system. The operating system 552 may include instructions for handling basic system services and for performing hardware dependent tasks. In some implementations, the operating system 552 can be a kernel or micro-kernel based operating system.

The memory 550 can also store communication instructions 554 to facilitate communicating with one or more additional devices, one or more computers and/or one or more servers, for example, to retrieve web resources from remote web servers. The memory 550 can also include user interface instructions 556, including graphical user interface instructions to facilitate graphic user interface processing.

Additionally, the memory 550 can store sensor processing instructions 558 to facilitate sensor-related processing and functions; telephony instructions 560 to facilitate telephone-related processes and functions; messaging instructions 562 to facilitate electronic-messaging related processes and functions; web browser instructions 564 to facilitate web browsing-related processes and functions; media processing instructions 566 to facilitate media processing-related processes and functions; location services instructions including GPS and/or navigation instructions 568 and Wi-Fi based location instructions to facilitate location based functionality; camera instructions 570 to facilitate camera-related processes and functions; and/or other software instructions 572 to facilitate other processes and functions, e.g., security processes and functions, and processes and functions related to the systems. The memory 550 may also store other software instructions such as web video instructions to facilitate web video-related processes and functions; and/or web shopping instructions to facilitate web shopping-related processes and functions. In some implementations, the media processing instructions 566 are divided into audio processing instructions and video processing instructions to facilitate audio processing-related processes and functions and video processing-related processes and functions, respectively. A mobile equipment identifier, such as an International Mobile Equipment Identity (IMEI) 574 or a similar hardware identifier can also be stored in memory 550.

Each of the above identified instructions and applications can correspond to a set of instructions for performing one or more functions described above. These instructions need not be implemented as separate software programs, procedures, or modules. The memory 550 can include additional instructions or fewer instructions. Furthermore, various functions may be implemented in hardware and/or in software, including in one or more signal processing and/or application specific integrated circuits.

Figure 6:
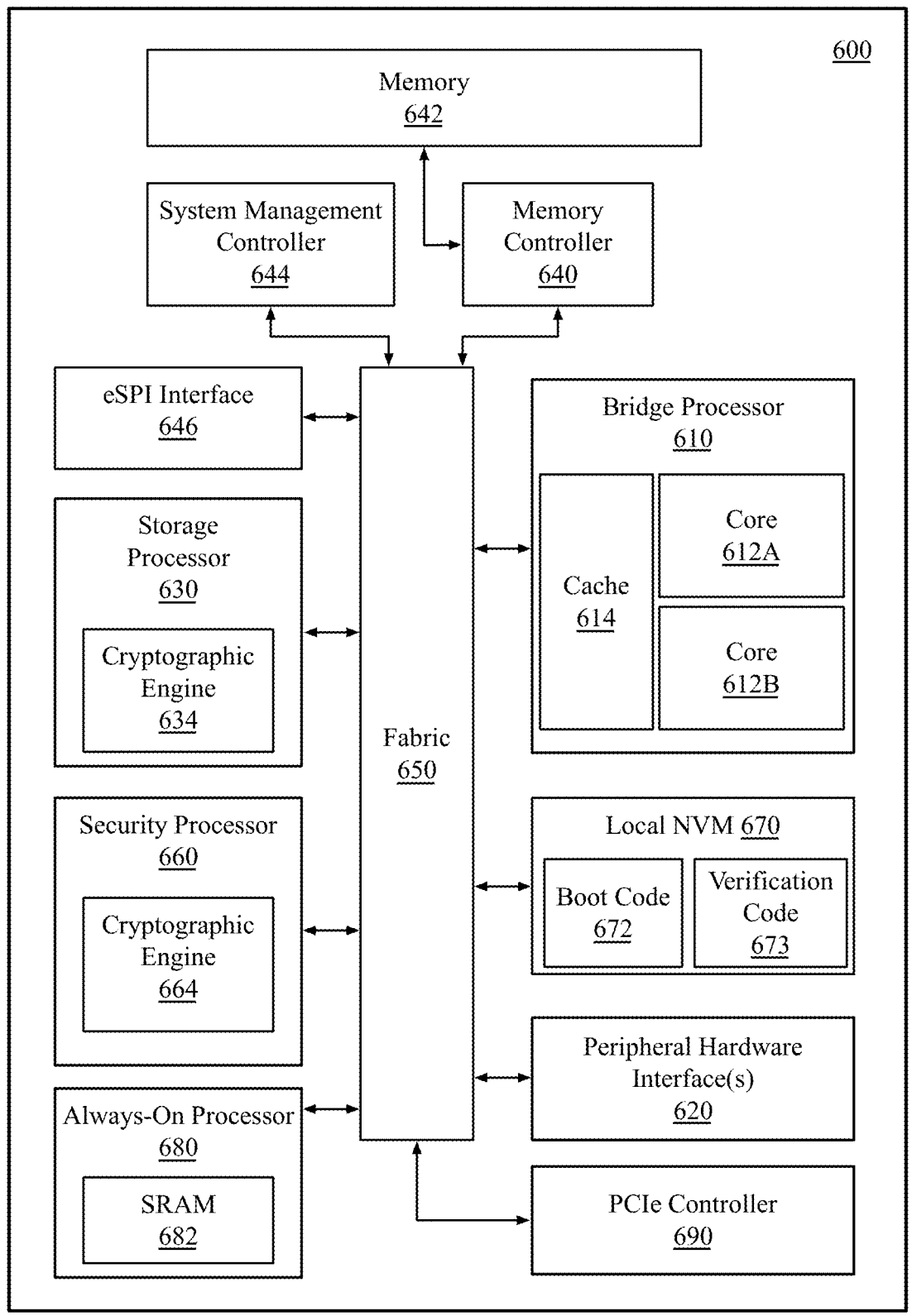
FIG. 6 is a block diagram of a platform processing system, according embodiments described herein.

FIG. 6 is a block diagram of a platform processing system 600, according to an embodiment. In one embodiment, the platform processing system 600 is a system on a chip integrated circuit that can be a variant of the platform processing system 506 of FIG. 5. The platform processing system, in one embodiment, includes a bridge processor 610 that facilitates an interface to the various system peripherals via one or more peripheral hardware interface(s) 620. In one embodiment, the platform processing system 600 includes a crossbar fabric that enables communication within the system, although a system bus may also be used in other embodiments. The platform processing system 600 can also include a system management controller 644 and always-on processor 680. The always-on processor can include SRAM 682 that is not required to be periodically refreshed, allowing a refresh circuit to be excluded. The platform processing system 600 can also include an eSPI interface 646, which can be an eSPI slave in communication with an eSPI master. The eSPI interface 646 can be used to enable the system management controller 644 to communicate with the compute SOC and other components external to the platform processing system 600. Additionally, the platform processing system 600 can also include a PCIe controller 690 to enable components of the platform processing system 600 to communicate with components of the computing device that are coupled to a PCIe bus within the system.

In one embodiment, the bridge processor 610 includes multiple cores 612A-612B and at least one cache 614. The bridge processor 610 can facilitate secure access to various peripherals described herein, including enabling secure access to camera, keyboard, or microphone peripherals to prevent an attacker from gaining malicious access to those peripherals. The bridge processor 610 can then securely boot a separate and complete operating system that is distinct from the user facing operating system that executes application code for the computing device. The bridge processor 610 can facilitate the execution of peripheral control firmware that can be loaded from local non-volatile memory 670 connected with the processor via the fabric 650. The peripheral firmware can be securely loaded into the memory 642 via a fabric-attached memory controller 640, enabling the bridge processor 610 to perform peripheral node functionality for the peripherals attached via the peripheral hardware interface(s) 620. In one embodiment, the peripheral firmware can also be included within or associated with secure boot code 672. The secure boot code 672 can be accompanied by verification code 673 that can be used verify that the boot code 672 has not been modified.

The platform processing system 600 also includes a security processor 660, which is a secure circuit configured to maintain user keys for encrypting and decrypting data keys associated with a user. As used herein, the term "secure circuit" refers to a circuit that protects an isolated, internal resource from being directly accessed by any external circuits. The security processor 660 can be used to secure communication with the peripherals connected via the peripheral hardware interface(s) 620. The security processor 660 can include a cryptographic engine 664 that includes circuitry to perform cryptographic operations for the security processor 660. The cryptographic operations can include the encryption and decryption of data keys that are used to perform storage volume encryption or other data encryption operations within a system.

The platform processing system 600 can also include a storage processor 630 that controls access to data storage within a system. The storage processor 630 can also include a cryptographic engine 634 to enable compressed data storage within the non-volatile memory. The cryptographic engine 634 can work in concert with the cryptographic engine 664 within the security processor 660 to enable high-speed and secure encryption and decryption of data stored in non-volatile memory. The cryptographic engine 634 in the storage processor 630 and the cryptographic engine 664 in the security processor may each implement any suitable encryption algorithm such as the Data Encryption Standard (DES), Advanced Encryption Standard (AES), Rivest Shamir Adleman (RSA), or Elliptic Curve Cryptography (ECC) based encryption algorithms.

Figure 7:
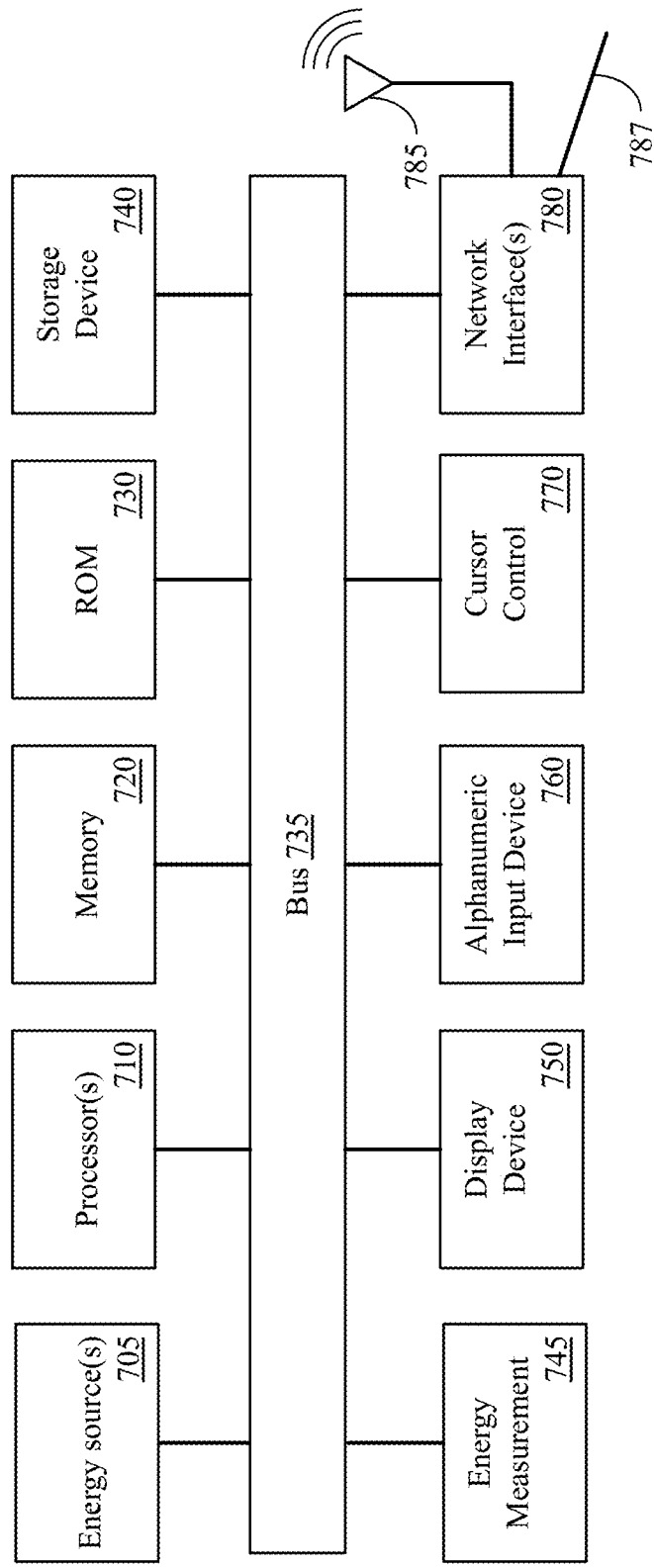
FIG. 7 is a block diagram of a computing system, according to an embodiment.

FIG. 7 is a block diagram of a computing system 700, according to an embodiment. The illustrated computing system 700 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 700 can be used to provide the computing device and/or a server device to which the computing device may connect.

The computing system 700 includes bus 735 or other communication device to communicate information, and processor(s) 710 coupled to bus 735 that may process information. While the computing system 700 is illustrated with a single processor, the computing system 700 may include multiple processors and/or co-processors. The computing system 700 further may include memory 720, such as random-access memory (RAM) or other dynamic storage device coupled to the bus 735. The memory 720 may store information and instructions that may be executed by processor(s) 710. The memory 720 may also be used to store temporary variables or other intermediate information during execution of instructions by the processor(s) 710.

The computing system 700 may also include read only memory (ROM) 730 and/or another data storage device 740 coupled to the bus 735 that may store information and instructions for the processor(s) 710. The data storage device 740 can be or include a variety of storage devices, such as a flash memory device, a magnetic disk, or an optical disc and may be coupled to computing system 700 via the bus 735 or via a remote peripheral interface.

The computing system 700 may also be coupled, via the bus 735, to a display device 750 to display information to a user. The computing system 700 can also include an alphanumeric input device 760, including alphanumeric and other keys, which may be coupled to bus 735 to communicate information and command selections to processor(s) 710. Another type of user input device includes a cursor control 770 device, such as a touchpad, a mouse, a trackball, or cursor direction keys to communicate direction information and command selections to processor(s) 710 and to control cursor movement on the display device 750. The computing system 700 may also receive user input from a remote device that is communicatively coupled via one or more network interface(s) 780. The various input devices of the computing system 700 may be in the form of the peripheral device 105 described herein.

The computing system 700 further may include one or more network interface(s) 780 to provide access to a network, such as a local area network. The network interface(s) 780 may include, for example, a wireless network interface having antenna 785, which may represent one or more antenna(e). The computing system 700 can include multiple wireless network interfaces such as a combination of Wi-Fi, Bluetooth®, near field communication (NFC), and/or cellular telephony interfaces. The network interface(s) 780 may also include, for example, a wired network interface to communicate with remote devices via network cable 787, which may be, for example, an Ethernet cable, a coaxial cable, a fiber optic cable, a serial cable, or a parallel cable.

In one embodiment, the network interface(s) 780 may provide access to a local area network, for example, by conforming to IEEE 802.7 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 780 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 700 can further include one or more energy sources 705 and one or more energy measurement systems 745. Energy sources 705 can include an AC/DC adapter coupled to an external power source, one or more batteries, one or more charge storage devices, a USB charger, or other energy source. Energy measurement systems include at least one voltage or amperage measuring device that can measure energy consumed by the computing system 700 during a predetermined period of time. Additionally, one or more energy measurement systems can be included that measure, e.g., energy consumed by a display device, cooling subsystem, Wi-Fi subsystem, or other frequently used or high-energy consumption subsystem.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A peripheral device comprising:
   a wireless data interface;
   a biometric sensor;
   a memory device; and
   a processor including a first secure circuit, the processor coupled with the wireless data interface and the memory device, the processor configured to execute instructions from the memory device to:
   establish a first encrypted local wireless data connection with a host device via the wireless data interface, the first encrypted local wireless data connection established via first cryptographic material derived using a public key generated by the first secure circuit;
   via the first encrypted local wireless data connection, establish a second encrypted local wireless data connection between the first secure circuit and a second secure circuit on the host device using second cryptographic material, the second cryptographic material derived using at least one key from the first secure circuit and at least one key from the second secure circuit, the second cryptographic material unknown to an application processor of the host device;
   construct, from biometric data captured from the biometric sensor and using the first secure circuit, a biometric image for validation by biometric authentication logic in the second secure circuit; and transmit, in response to the construction, the biometric image or features extracted from the biometric image from the first secure circuit to the second secure circuit via the second encrypted local wireless data connection using the second cryptographic material so that the biometric image is unknown to the application processor of the host device.

2. The peripheral device as in claim 1, wherein the second encrypted local wireless data connection is encapsulated within the first encrypted local wireless data connection and wherein the first encrypted local wireless data connection is a Bluetooth connection.

3. The peripheral device as in claim 1, wherein the processor is configured to receive the biometric data from the biometric sensor and transmit a request to authenticate the biometric data to the host device over the wireless data interface via the second encrypted local wireless data connection.

4. The peripheral device as in claim 3, wherein the first secure circuit is to read a biometric sensor key that identifies the biometric sensor and validate the biometric sensor based on the biometric sensor key.

5. The peripheral device as in claim 1, wherein the processor is configured to validate authenticity of the host device via a first attestation key, the first attestation key used to verify a portion of the first cryptographic material that is received from the host device.

6. The peripheral device as in claim 5, wherein the first secure circuit is configured to validate authenticity of the second secure circuit via a second attestation key that differs from the first attestation key, the second attestation key used to verify a portion of the second cryptographic material that is received from the second secure circuit.

7. The peripheral device as in claim 1, wherein the processor is configured to:
after the second encrypted local wireless data connection is established, establish a pairing between the first secure circuit and the second secure circuit.

8. The peripheral device as in claim 7, wherein the processor is configured to:
store pairing information for the pairing between the first secure circuit and the second secure circuit to a non-volatile memory device of the peripheral device, wherein the pairing information includes hardware identifiers of the first secure circuit and the second secure circuit.

9. The peripheral device as in claim 8, wherein the processor is configured to:
encrypt the pairing information via third cryptographic material, wherein the third cryptographic material is cryptographically related to a hardware key stored within the second secure circuit.

10. A method comprising:
establishing, by a peripheral device including a biometric sensor and a first secure circuit, a first encrypted local wireless data connection with a host device using first cryptographic material derived using a public key generated by the first secure circuit;
establishing a second encrypted local wireless data connection between the first secure circuit on the peripheral device and a second secure circuit on the host device using second cryptographic material derived using at least one key from the first secure circuit and at least one key from the second secure circuit, the second encrypted local wireless data connection established via the first encrypted local wireless data connection, the second cryptographic material unknown to an application processor of the host device;
constructing, from biometric data captured from the biometric sensor and using the first secure circuit, a biometric image for validation by biometric authentication logic in the second secure circuit; and
transmitting, in response to the construction, the biometric image or features extracted from the biometric image from the first secure circuit to the second secure circuit via the second encrypted local wireless data connection using the second cryptographic material so that the biometric image is unknown to the application processor of the host device.

11. The method as in claim 10, wherein the second encrypted local wireless data connection is encapsulated within the first encrypted local wireless data connection and wherein the first encrypted local wireless data connection is a Bluetooth connection.

12. The method as in claim 10, further comprising capturing the biometric data via the biometric sensor and transmitting a request to authenticate the biometric data to the host device via the second encrypted local wireless data connection.

13. The method as in claim 12, further comprising reading, by the first secure circuit, a biometric sensor key that identifies the biometric sensor and validating the biometric sensor based on the biometric sensor key.

14. The method as in claim 10, further comprising validating authenticity of the host device via a first attestation key, the first attestation key used to verify a portion of the first cryptographic material that is received from the host device.

15. The method as in claim 14, further comprising validating authenticity of the second secure circuit via a second attestation key that differs from the first attestation key, the second attestation key used to verify a portion of the second cryptographic material that is received from the second secure circuit.

16. The method as in claim 10, further comprising, after the second encrypted local wireless data connection is established, establishing a pairing between the first secure circuit and the second secure circuit.

17. The method as in claim 16, further comprising storing pairing information for the pairing between the first secure circuit and the second secure circuit to a non-volatile memory device of the peripheral device, wherein the pairing information includes hardware identifiers of the first secure circuit and the second secure circuit.

18. The method as in claim 17, further comprising encrypting the pairing information via third cryptographic material, wherein the third cryptographic material is cryptographically related to a hardware key stored within the second secure circuit.

* * * * *